March 15, 1932.   A. V. BEDFORD   1,849,819
SOUND RECORDING AND REPRODUCING APPARATUS
Filed Aug. 4, 1930
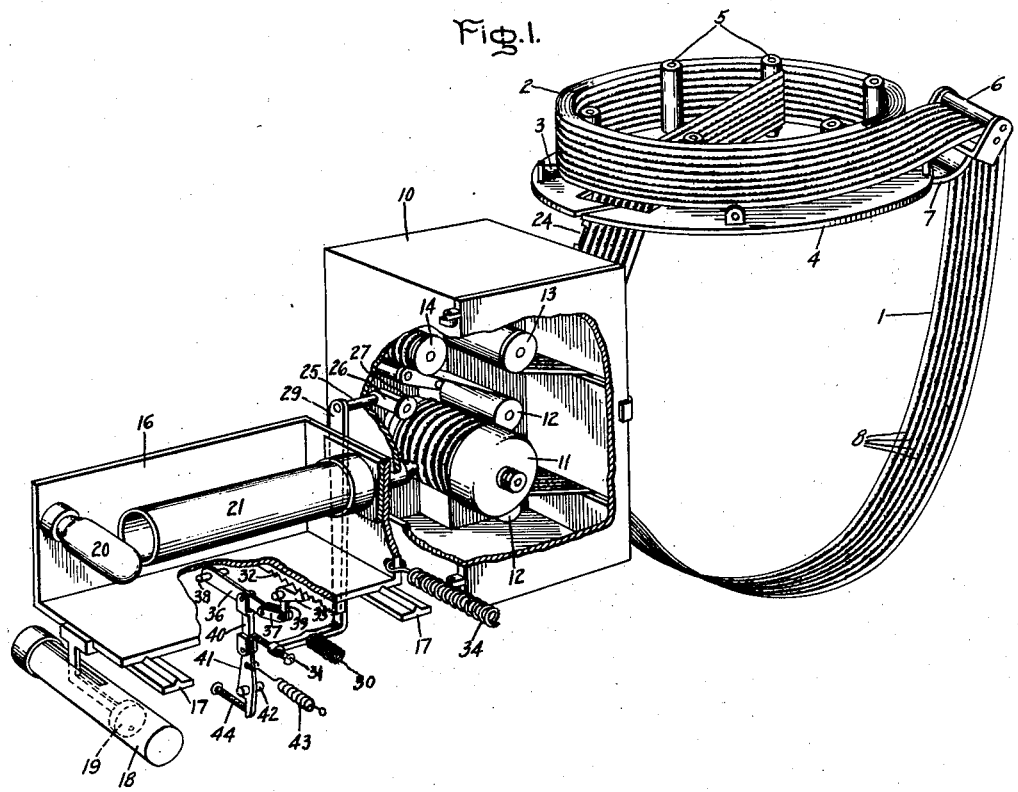
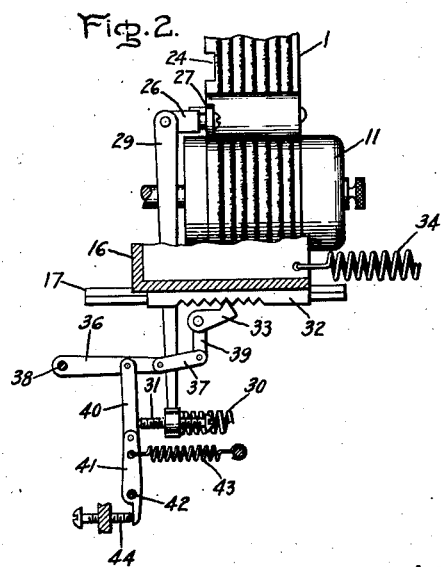
Inventor:
Alda V. Bedford,
by Charles E. Tullar
His Attorney.

Patented Mar. 15, 1932

1,849,819

UNITED STATES PATENT OFFICE

ALDA V. BEDFORD, OF MERCHANTVILLE, NEW JERSEY, ASSIGNOR TO GENERAL ELECTRIC COMPANY, A CORPORATION OF NEW YORK

SOUND RECORDING AND REPRODUCING APPARATUS

Application filed August 4, 1930. Serial No. 473,088.

My invention relates to apparatus for recording sound on a film or reproducing sound from a film record. In the copending application of Clarence W. Hewlett, Serial No. 360,974, filed May 6, 1929, for film phonograph and assigned to the same assignee as the present application, there is described and claimed an apparatus for reproducing sound from a record film having a plurality of sound record tracks thereon including an optical system and means for shifting the same at the proper time from one sound track to the next. The shifting means in that case is electrical and is controlled by a contact carried by the film. It is the object of my invention to provide an improved apparatus of the character disclosed by the above mentioned application wherein mechanical rather than electrical means are employed for effecting the shifting of the optical system.

My invention will be better understood from the following description taken in connection with the accompanying drawings, and its scope will be pointed out in the appended claims.

Referring to the drawings, Fig. 1 is a perspective view with parts broken away of a mechanism forming one embodiment of my invention; and Fig. 2 is a detail thereof drawn to a slightly larger scale.

The film 1 of the well known motion picture type shown without sprocket tooth openings and having its two ends secured together to form a continuous or endless band, forms for the most part the coil 2 which is supported by the rollers 3 on the plate 4 and which extends over the guide rollers 5. Additional guide rollers are provided for the film where it leaves and enters the coil, the rollers in the latter position being shown at 6 supported by the arm 7 on plate 4. When the machine is in operation the film is withdrawn from the inside of the coil and winds up on the outside thereof. The particular film illustrated has the sound record formed in a plurality of separate parallel spaced tracks 8, seven in the present case, which are traversed successively in the reproduction.

Adjacent the film coil is the housing 10 having a door at one side and having suitable openings in another side through which the free loop of the film extends. Within the housing is the hollow driving drum 11 over which the film passes and against which the film is pressed by the two rubber faced rollers 12. The drum has a cut away portion (not shown) under all that portion of the film covered by the sound record tracks so that the film is supported on the drum only at its marginal portions in a manner shown for example in the British Patent No. 293,380, June 9, 1928. The drum is rotated at a uniform speed by suitable motor mechanism which is not shown and which forms no part of my present invention. Suitably supported from the rear of the housing by means not shown is a photoelectric cell which is positioned within the drum in a manner to receive light rays modified by the sound record from the optical system to be described later. The cell may be connected through suitable amplifying devices to a loud speaker in the well understood manner. Between the upper roller 12 and the entrance opening in the casing the film passes successively under the idler 13 and over the idler 14 of which the latter at least has end flanges to guide the film laterally on the drum.

At the side of the casing 10 oposite to that having the openings for the film, I have shown a carriage 16 mounted to slide on the guides 17 in a direction parallel to the axis of the drum. On this carriage is mounted the optical system by means of which a very narrow light beam is focused on the film where it is supported by the drum. Movement of the carriage 16 in the forward direction is dampened by the dash pot comprising the horizontal cylinder 18 in which slides the piston 19 secured to the carriage and having a small by-pass opening therein for the oil or other suitable fluid used in the dash pot. The optical system is shown as comprising the light source 20 having a suitable concentrated filament and the mounting tube 21 containing a light slit and a lens system by which a reduced image of the slit is focused on the film. The tube 21 extends beyond the carriage and into the casing through a slot therein which preferably is covered in a light-tight manner by the carriage.

The several sound tracks 8 on the film constitute in effect a continuous record which quickly transfers from one track to the next at each complete passage of the film. For shifting the optical system from one track to the next automatically under the control of the film and at the proper time, I have provided the means which I shall now describe.

In one edge of the film and adjacent that part thereof where the transfer of a record takes place from one track to the next I provide the film with means for controlling the movement of a control wheel engaging the film. In the form of my invention which I have illustrated, this means is the film notch 24. Journaled in the wall of the casing 10 is the shaft 25 to the inner end of which is secured the arm 26 carrying the wheel 27. This wheel is arranged to roll on the marginal portion of the film having the notch 24 so that when the notch passes over the drum the roller will momentarily move into contact with the drum. To the outer end of the shaft 25 is secured the arm 29 against which presses the compression spring 30 and which carries at its end the actuating screw 31. On the bottom of the carriage 16 is the ratchet bar 32 and engaging this bar is the pawl 33. For advancing or shifting the carriage 16 I have shown the tension spring 34 which when permitted by the ratchet and pawl mechanism moves the carriage to the right on the guides 17. The carriage is normally retained against the pull of the spring 34 by the pawl and a double toggle mechanism which is adapted to be tripped as a result of the movement of the roller 27 in dropping into the film notch 24. This double toggle mechanism comprises the links 36 and 37, the former of which is held by the fixed pivot 38 and the latter of which is pivoted to the arm 39 secured to the pawl 33. The second toggle comprising links 40 and 41 connects respectively with link 36 and with the fixed pivot 42. Actuating screw 31 on the arm 29 is adapted to engage link 40 when the film notch passes under roller 27. The toggle comprising links 40 and 41 is biased to a straightened position by the light tension spring 43 and is prevented from passing beyond the straightened position under the influence of the spring by the adjustable stop screw 44.

As shown more clearly by Fig. 2 the carriage normally is maintained against the pull of spring 34 in any one of its several positions wherein the optical system is adjacent a sound track by the engagement of pawl 33 with a tooth of the ratchet. The reaction of the tooth on the pawl tends to cause the toggle 36—37 to buckle, it being noted that it is slightly underset. This toggle, however, is prevented from buckling by the toggle 40—41 which is held in a straightened position by the spring 43 and stop 44. When the film has advanced to the position where the sound record transfers from one track to the next, the roller 27 drops momentarily into the notch 24 causing the screw 31 on arm 29 to throw the toggle 40—41 over center where the reaction from toggle 36—37 can cause it to buckle. As a result both toggles 40—41 and 36—37 buckle sufficiently to allow the pawl 33 to release the carriage which under the action of spring 34 now advances. Movement of the carriage is so dampened, however, by the dash pot that after the carriage has advanced one tooth the two toggle mechanisms will have become reset by the spring 43 thus maintaining the pawl in engagement with the next tooth of the ratchet, it being understood that the roller 27 has passed the notch in the film and is again rolling upon the film so that screw 31 does not prevent the toggle 40—41 from being moved to straightened position. In a like manner the carriage supporting the optical system is advanced step by step each time the entire length of film passes over the drum.

I have already stated above that my invention is applicable either to record sound on a film or to reproduce from a film sound record. If it is employed for recording purposes it will be understood that the film will be completely enclosed in a light-tight casing, that the photoelectric cell is not used and that the light beam by which the film is exposed will vary in any suitable manner in accordance with the sound waves to be recorded. Certain features of my invention are applicable also to recording and reproducing apparatus using a film which is not endless in which case the sound record is transferred from one track to the next near each end of the film, means being used at each point of transfer to cause the shift at the proper time.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent of the United States, is:

1. In apparatus for recording sound on or reproducing from a film having a plurality of sound tracks, a film supporting member, a member supporting an optical system associated therewith, one said member being shiftable relatively to the other transversely of the film, a controlling member arranged to engage the film, controlling means engaging one of said members and mechanical connecting means between said controlling member and said controlling means.

2. In apparatus for recording sound on or reproducing from a film having a plurality of sound tracks, a film supporting member, an optical system associated therewith and shiftable transversely of the film, a controlling member arranged to engage a marginal portion of the film, and mechanism entirely mechanical responsive to said controlling member for shifting the optical system.

3. In apparatus for recording sound on or reproducing from a film having a plurality of sound tracks, a film supporting member, an optical system associated therewith and shiftable transversely of the film, a controlling member arranged to engage a marginal portion of the film and movable toward and from the film, mechanical retaining means for said system and means mechanically connecting said retaining means and said controlling member.

4. In apparatus for recording sound on or reproducing from a film having a plurality of sound tracks, a film supporting member, an optical system associated therewith and shiftable transversely of the film, a controlling member arranged to engage a marginal portion of the film and movable with respect thereto, means for shifting the optical means, and retaining means therefor comprising a ratchet and a pawl said pawl being arranged to be actuated by the movement of said controlling member.

5. In apparatus for recording sound on or reproducing from a film having a plurality of sound tracks, a film supporting member, an optical system associated therewith and shiftable transversely of the film, a roller adapted to engage a marginal portion of the film and mounted for movement toward and from said film supporting member, means for shifting said optical system, retaining means therefor comprising a ratchet and pawl, and toggle means connected with said roller.

6. In apparatus for recording sound on or reproducing from a film having a plurality of sound tracks thereon and having an actuating notch in one edge thereof, a supporting drum for the film, an optical system, a supporting carriage therefor mounted for movement transversely to the film, a roller mounted to engage the edge portion of the film having the notch, a spring for shifting the carriage, ratchet and pawl retaining means for the carriage, toggle mechanism for controlling the pawl in response to movement of said roller, and a dash pot for damping the movement of the carriage.

In witness whereof, I have hereunto set my hand this 30th day of July, 1930.

ALDA V. BEDFORD.